US012650301B2

(12) United States Patent
Kobayashi et al.

(10) Patent No.: US 12,650,301 B2
(45) Date of Patent: Jun. 9, 2026

(54) MONITORING DEVICE, MONITORING SYSTEM, MONITORING METHOD, AND PROGRAM FOR DETERMINING DEGREE OF DAMAGE

(71) Applicant: MITSUBISHI HEAVY INDUSTRIES, LTD., Tokyo (JP)

(72) Inventors: Takaaki Kobayashi, Tokyo (JP); Yuma Itahashi, Tokyo (JP); Takeshi Kodaira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 950 days.

(21) Appl. No.: 17/274,977

(22) PCT Filed: Apr. 26, 2019

(86) PCT No.: PCT/JP2019/017936
§ 371 (c)(1),
(2) Date: Mar. 10, 2021

(87) PCT Pub. No.: WO2020/054124
PCT Pub. Date: Mar. 19, 2020

(65) Prior Publication Data
US 2022/0057200 A1 Feb. 24, 2022

(30) Foreign Application Priority Data

Sep. 13, 2018 (JP) ................................. 2018-171906

(51) Int. Cl.
G01B 17/02 (2006.01)
G01N 29/07 (2006.01)

(52) U.S. Cl.
CPC ............. G01B 17/02 (2013.01); G01N 29/07 (2013.01); G01N 2291/02854 (2013.01)

(58) Field of Classification Search
CPC ................... G01B 17/02; G01N 29/07; G01N 2291/02854; G01M 99/00; G05B 23/02
See application file for complete search history.

(56) References Cited

U.S. PATENT DOCUMENTS 9,638,357 B1 * 5/2017 Raghavan ................. F16L 9/02
2003/0083576 A1 * 5/2003 Bazarov ............... G01N 29/265
600/437

(Continued)

FOREIGN PATENT DOCUMENTS

JP 2001-280600 A 10/2001
JP 2002156325 A * 5/2002

OTHER PUBLICATIONS

International Search Report dated Jul. 16, 2019, issued in counterpart application No. PCT/JP2019/017936, with English translation. (4 pages).

(Continued)

*Primary Examiner* — Shelby A Turner
*Assistant Examiner* — Yaritza H Perez Bermudez
(74) *Attorney, Agent, or Firm* — WHDA, LLP

(57) ABSTRACT

A monitoring device is provided that is capable of quickly and accurately detecting the occurrence of an abnormality in a pipe on the basis of the trend of the wall thickness of the pipe. The monitoring device includes a degree of damage acquisition unit configured to acquire a degree of damage to a pipe, and a determination unit configured to determine whether the degree of damage has fallen lower than a lower limit threshold value determined on the basis of a reference operating parameter related to fluid flowing through the pipe.

5 Claims, 8 Drawing Sheets

(56)                     References Cited

U.S. PATENT DOCUMENTS

2018/0292292 A1*  10/2018  Takahashi .............. G01N 29/07
2018/0356046 A1*  12/2018  Gong ........................ F17D 5/06
2019/0154637 A1*   5/2019  Kusumoto ................ F17D 5/00
2019/0224513 A1*   7/2019  Goyette ............... G01N 17/043
2021/0388950 A1*  12/2021  Solomon ................ G06Q 10/20

OTHER PUBLICATIONS

Written Opinion dated Jul. 16, 2019, issued in counterpart application No. PCT/JP2019/017936, with English translation. (7 pages).

* cited by examiner

CAUSE DETERMINATION INFORMATION — D01

| | POSSIBILITY TO BE CAUSE | NOTE |
|---|---|---|
| TEMPERATURE | LOW | NO CHANGE |
| FLOW RATE | HIGH | CHANGE FROM r1 TO r2 AT TIME T1 |
| WATER QUALITY | LOW | NO CHANGE |

PIPE MODEL — M

THICKNESS REDUCTION TREND DATA(RESULT VALUE) — D1

OPERATING PARAMETER (RESULT VALUE) — D2
- TEMPERATURE
- FLOW RATE
- WATER QUALITY (CONDUCTIVITY)

PIPE SPECIFICATIONS — D3
- DIAMETER
- WALL THICKNESS
- MATERIAL

MONITORING DEVICE, MONITORING SYSTEM, MONITORING METHOD, AND PROGRAM FOR DETERMINING DEGREE OF DAMAGE

TECHNICAL FIELD

The present invention relates to a monitoring device, a monitoring system, a monitoring method, and a program.

Priority is claimed on Japanese Patent Application No. 2018-171906, filed Sep. 13, 2018, the content of which is incorporated herein by reference.

BACKGROUND ART

High-temperature and high-pressure water and steam flow through pipes installed in power plants, chemical plants, and the like, and the pipes are exposed to harsh environments. Therefore, thickness reduction over time occurs on an inner surface of the pipe due to corrosion, abrasion, or a combination thereof. In order to prevent the pipe from being damaged due to such thickness reduction, it is required to manage the wall thickness of the pipe (for example, see Patent Literature 1).

CITATION LIST

Patent Literature

Patent Literature 1

Japanese Unexamined Patent Application, First Publication No. 2001-280600

SUMMARY OF INVENTION

Technical Problem

There is a need to precisely ascertain changes in the wall thickness of a pipe over time through continuous monitoring of the wall thickness of the pipe, and to quickly and accurately detect the occurrence of an abnormality on the basis of the trend of the wall thickness of the pipe.

The present invention provides a monitoring device, a monitoring system, a monitoring method, and a program, by which it is possible to solve the above problems.

Solution to Problem

According to an aspect of the present invention, a monitoring device includes a degree of damage acquisition unit configured to acquire a degree of damage to a pipe, and a determination unit configured to determine whether the degree of damage has fallen lower than a lower limit threshold value determined on the basis of a reference operating parameter related to fluid flowing through the pipe.

According to an aspect of the present invention, the aforementioned monitoring device further includes an alert-processing unit configured to perform an alert process when the degree of damage has fallen lower than the lower limit threshold value.

According to an aspect of the present invention, the aforementioned monitoring device further includes a cause-identifying unit configured to identify a cause operating parameter, which is an operating parameter that causes the degree of damage to fall lower than the lower limit threshold value, among a plurality of operating parameters related to the fluid flowing through the pipe when the degree of damage has fallen lower than the lower limit threshold value.

According to an aspect of the present invention, the aforementioned monitoring device further includes a recommended operation-computing unit configured to, when a first required value related to a degree of change in the degree of damage is received, output a recommended operating parameter that is an operating parameter satisfying the first required value.

According to an aspect of the present invention, when a second required value related to some of the plurality of operating parameters is further received, the recommended operation-computing unit calculates the recommended operating parameter that is a combination of operating parameters satisfying the second required value.

According to an aspect of the present invention, the first required value is a target value of a rate of thickness reduction to be acquired and the second required value is the cause operating parameter applied at the time point at which the second required value is received.

According to an aspect of the present invention, a monitoring system includes the aforementioned monitoring device and a wall thickness sensor attached to the pipe.

According to an aspect of the present invention, a monitoring method includes a step of acquiring a degree of damage to a pipe, and a step of determining whether the degree of damage has fallen lower than a lower limit threshold value determined on the basis of a reference operating parameter related to fluid flowing through the pipe.

According to an aspect of the present invention, a program causes a computer to perform a step of acquiring a degree of damage to a pipe, and a step of determining whether the degree of damage has fallen lower than a lower limit threshold value determined on the basis of a reference operating parameter related to fluid flowing through the pipe.

Advantageous Effects of Invention

According to the monitoring device, the monitoring system, the monitoring method, and the program described above, it is possible to quickly and accurately detect the occurrence of an abnormality in a pipe on the basis of the trend of the wall thickness of the pipe.

BRIEF DESCRIPTION OF DRAWINGS

FIG. 2 is a diagram showing a functional configuration of a monitoring device according to the first embodiment.

FIG. 4 is a diagram showing a specific aspect of a process performed by the monitoring device according to the first embodiment.

FIG. 5 is a diagram showing a specific aspect of a process performed by the monitoring device according to the first embodiment.

DESCRIPTION OF EMBODIMENTS

First Embodiment

Hereinafter, a monitoring device according to the first embodiment and a monitoring system including the same will be described with reference to FIG. 1 to FIG. 7.

(Overall Configuration of Monitoring System)

Figure 1:
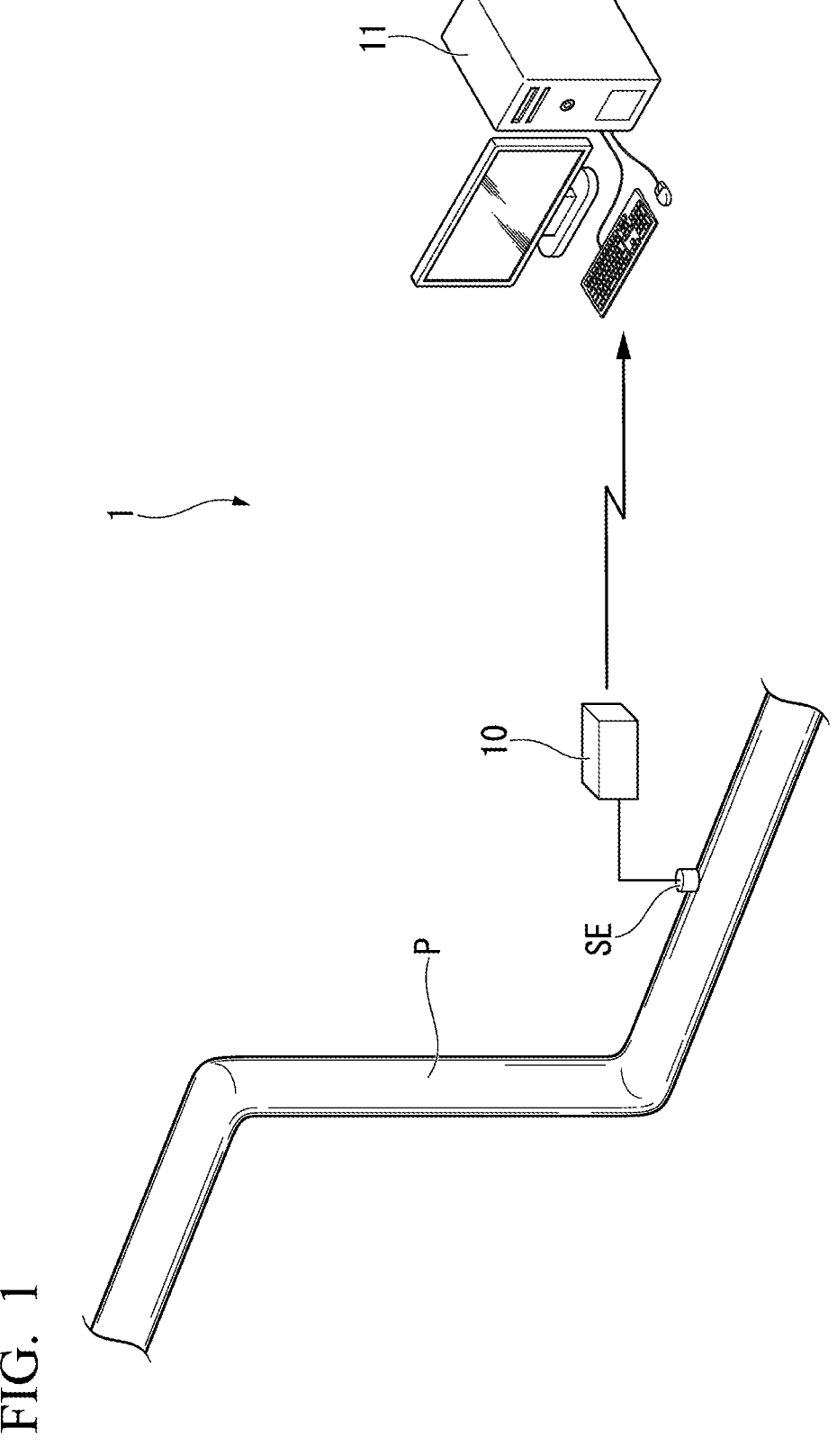
FIG. 1 is a diagram showing an overall configuration of a monitoring system according to a first embodiment.

FIG. 1 is a diagram showing an overall configuration of a monitoring system according to the first embodiment.

A monitoring system 1 according to the present embodiment may be applied to, for example, a carbon steel pipe (hereinafter, also referred to as a "pipe P") of a secondary cooling system in a nuclear power plant. According to such an aspect, since high-temperature water and steam flow through the pipe P, an inner surface of the pipe gradually wears and thickness reduction occurs overtime.

In other embodiments, the monitoring system 1 can also be applied to plant facilities and pipes other than a nuclear power plant.

As shown in FIG. 1, the monitoring system 1 includes a wall thickness sensor 10 and a monitoring device 11.

The wall thickness sensor 10 is fixedly installed on an outer surface of the pipe P whose wall thickness is to be monitored. The wall thickness sensor 10 continuously monitors the wall thickness of the pipe P through an ultrasonic sensor element SE attached to the outer surface of the pipe P. The wall thickness sensor 10 sequentially transmits the measured values of the wall thickness, which are acquired through the ultrasonic sensor element SE, to the monitoring device 11 in a wireless manner.

The monitoring device 11 is a computer that monitors the pipe P. Specifically, the monitoring device 11 stores and analyzes the measured values of the wall thickness, which are sequentially received from the wall thickness sensor 10, in time series. The monitoring device 11 is installed at a position (control room and the like) away from the pipe P. The specific functional configuration and processing flow of the monitoring device 11 will be described below.

(Functional Configuration of Monitoring Device)

Figure 2:
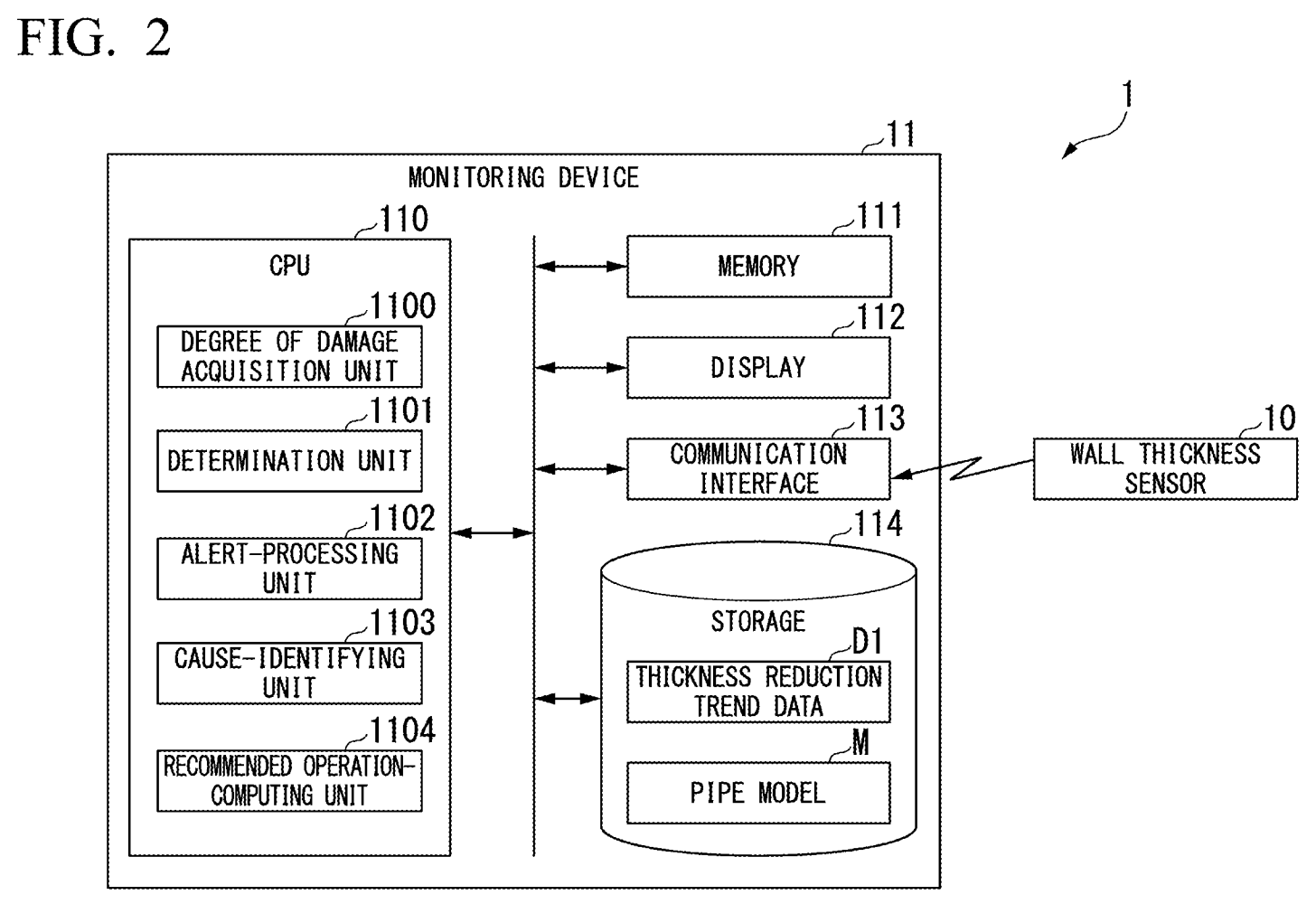

FIG. 2 is a diagram showing a functional configuration of the monitoring device according to the first embodiment.

As shown in FIG. 2, the monitoring device 11 includes a CPU 110, a memory 111, a display 112, a communication interface 113, and a storage 114.

The CPU 110 constitutes each of functional blocks to be described below by operating according to programs prepared in advance. Each function of the CPU 110 will be described below. In other embodiments, the CPU 110 may be a CPU-like processor such as an FPGA and a GPU.

The memory 111 is a so-called main storage device and serves as a work area of the CPU 110.

The display 112 is, for example, a liquid crystal display, an organic EL display, and the like, and displays, for example, a time series of the wall thickness of the pipe P (thickness reduction trend data D1 to be described below) and the like.

The communication interface 113 is a communication interface for wireless communication with the wall thickness sensor 10.

The storage 114 is a so-called auxiliary storage device, and stores the time series of the wall thickness of the pipe P (thickness reduction trend data D1) to be monitored and a pipe model M, in addition to the program for operating the CPU 110.

The pipe model M will be described. The pipe model M is a simulation model constructed in advance on the basis of physical laws, supervised learning, and the like. The pipe model M can simulate thickness reduction of a pipe through computer computations. The pipe model M according to the present embodiment can use, for example, operating parameters (parameters such as temperature, flow rate, and water quality of a fluid) related to a fluid flowing through the pipe and pipe specifications (parameters such as a diameter, wall thickness, and material) as input parameters, thereby outputting simulation results of change in wall thickness over time (a thickness reduction trend) according to these input parameters.

The various aforementioned operating parameters are continuously monitored during the operation of the plant, and recorded and stored together with the measured values of the wall thickness of the pipe P. For example, the pipe model M can be constructed by using the relationship between the result values of various operating parameters and the actually acquired result values of the thickness reduction trend as teaching data.

The "water quality", which is one of the operating parameters, is, for example, the concentration of chemicals (rust preventives) contained in water or an oxygen concentration. Such chemical concentrations or an oxygen concentration can be indirectly ascertained by monitoring the conductivity of water flowing through the pipe.

Next, various functional blocks of the CPU 110 will be described.

The CPU 110 operates according to a predetermined program, thereby serving as a degree of damage acquisition unit 1100, a determination unit 1101, an alert-processing unit 1102, a cause-identifying unit 1103, and a recommended operation-computing unit 1104.

The degree of damage acquisition unit 1100 sequentially receives and acquires the measured value of the wall thickness from the wall thickness sensor 10. The degree of damage acquisition unit 1100 further records the measured values of the wall thickness of the pipe P in the storage 114 as a time series (thickness reduction trend data D1). The wall thickness of the pipe P is one aspect of the "degree of damage" to the pipe P.

The determination unit 1101 determines whether the wall thickness of the pipe P has fallen lower than a lower limit threshold value determined on the basis of reference operating parameters related to fluid (steam or water) flowing through the pipe P. The "reference operating parameters" and the "lower limit threshold value" will be described below.

The alert-processing unit 1102 performs an alert process for notifying an operator when the wall thickness of the pipe P has fallen lower than the lower limit threshold value.

The cause-identifying unit 1103 identifies a "cause operating parameter" from a plurality of operating parameters related to the fluid (steam or water) flowing through the pipe P when the wall thickness of the pipe P has fallen lower than the lower limit threshold value. The "cause operating parameter" indicates an operating parameter that is likely to have been a direct cause of the measured value of the wall thickness of the pipe P falling lower than the lower limit threshold value. It is also conceivable that the wall thickness of the pipe P may fall lower than the lower limit threshold value due to a combination of two or more operating parameters. Therefore, the cause-identifying unit 1103 also has a function of identifying a combination of two or more operating parameters as the "cause operating parameter".

The recommended operation-computing unit 1104 calculates an operating parameter (hereinafter, also referred as a "recommended operating parameter") having a first required value related to a rate of thickness reduction (degree of change in wall thickness) when the first required value is received from the operator. When a second required value related to some of the plurality of operating parameters is received from the operator, the recommended operation-computing unit 1104 calculates a recommended operating parameter satisfying the second required value.

(Processing Flow of Monitoring Device)

Figure 3:
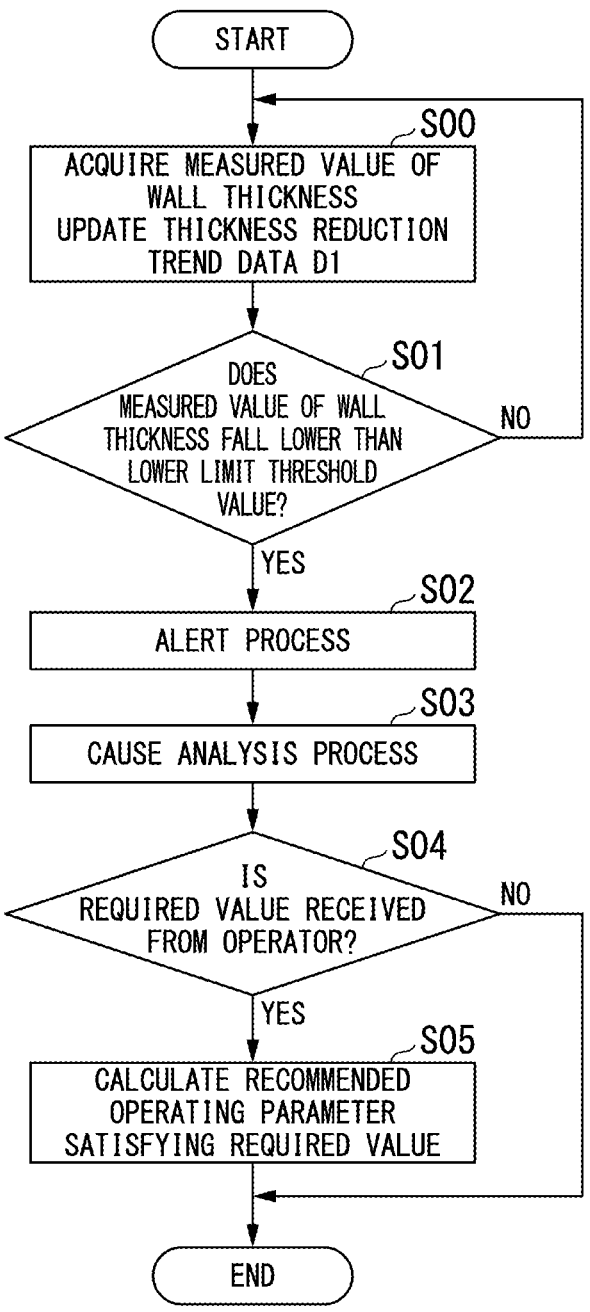
FIG. 3 is a diagram showing a processing flow performed by the monitoring device according to the first embodiment.

FIG. 3 is a diagram showing a processing flow performed by the monitoring device according to the first embodiment.

FIG. 4 to FIG. 7 are diagrams showing specific aspects of a process performed by the monitoring device according to the first embodiment.

Hereinafter, the process of the monitoring device 11 will be described in detail with reference to FIG. 3 and FIG. 4 to FIG. 7.

As shown in FIG. 3, first, the degree of damage acquisition unit 1100 of the monitoring device 11 acquires the measured value of the wall thickness of the pipe P through the wall thickness sensor 10. Then, the degree of damage acquisition unit 1100 updates the newly acquired measured value of the wall thickness in addition to the thickness reduction trend data D1, which is a time series of the measured values (step S00).

Next, the determination unit 1101 of the monitoring device 11 determines whether the newly acquired measured value of the wall thickness falls lower than a predetermined lower limit threshold value Lmin (step S01).

When the measured value of the wall thickness newly acquired in step S00 does not fall lower than the predetermined lower limit threshold value Lmin (step S01; NO), the degree of damage acquisition unit 1100 returns to step S00 and further acquires a new measured value of the wall thickness.

On the other hand, when the newly acquired measured value of the wall thickness falls lower than the predetermined lower limit threshold value Lmin (step S01; YES), the alert-processing unit 1102 of the monitoring device 11 performs an alert process for notifying the operator that the newly acquired measured value of the wall thickness falls lower than the predetermined lower limit threshold value Lmin (step S02).

According to the function of the alert-processing unit 1102, an alert is issued when the thickness reduction trend data D1 has fallen lower than the predetermined lower limit threshold value Lmin. With this, the operator can quickly and accurately ascertain the occurrence of some abnormality in the pipe P on the basis of the thickness reduction trend of the pipe P.

Hereinafter, the thickness reduction trend data D1 and the lower limit threshold value Lmin will be described in detail with reference to FIG. 4.

The thickness reduction trend data D1 will be described.

The thickness reduction trend data D1 is a time series of the measured value (result value) of the wall thickness acquired through the wall thickness sensor 10. In the example shown in FIG. 4, the thickness reduction trend data D1 from an operation start time (time T0) to a current time (time T2) is acquired.

Figure 4:
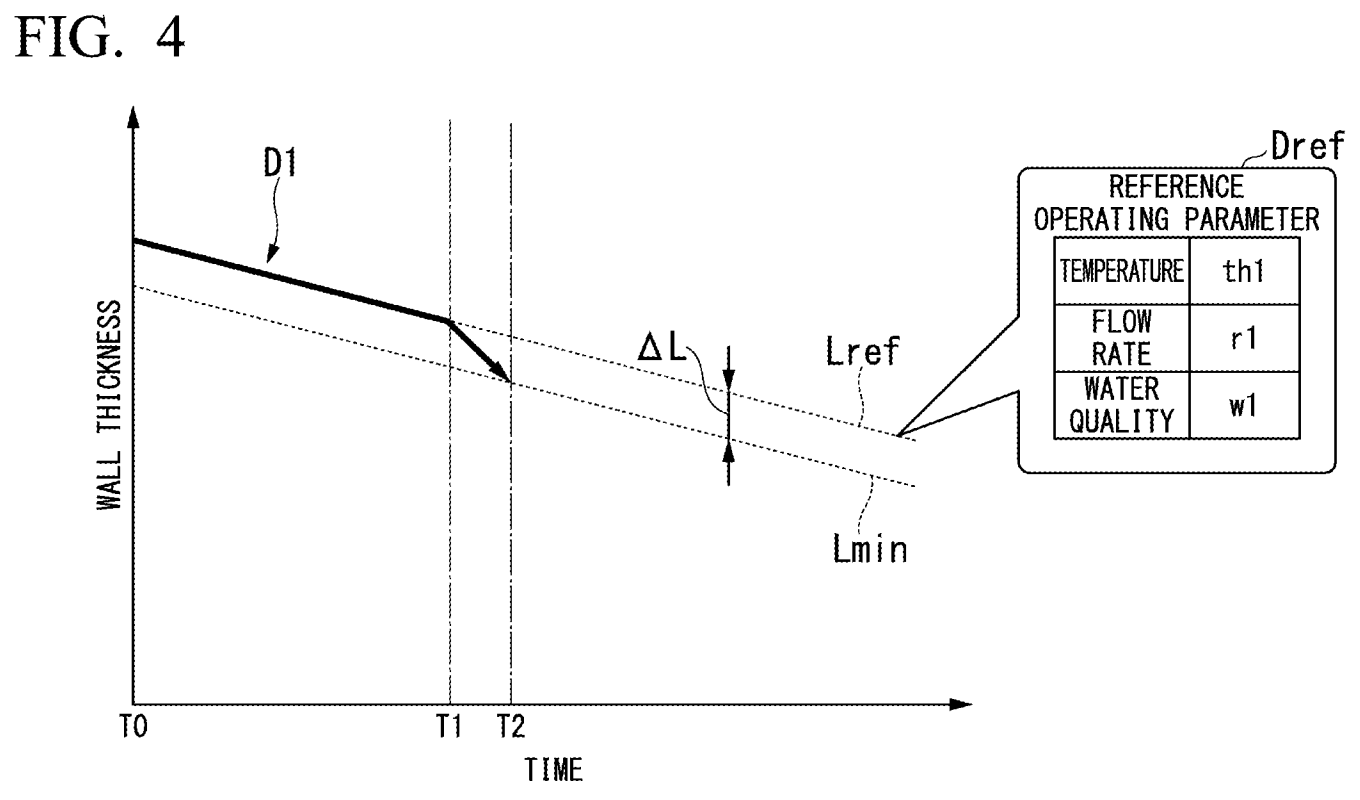

The monitoring device 11 may display the thickness reduction trend data D1 in realtime through the display 112 while visualizing the thickness reduction trend data D1 in a graph as shown in FIG. 4. By so doing, it is possible to notify the operator of a change in the wall thickness of the pipe P over time in a visually easy-to-understand format.

The lower limit threshold value Lmin will be described.

As described in step S01, the lower limit threshold value Lmin is defined as a condition for performing the alert process (step S02) and the like. The lower limit threshold value Lmin according to the present embodiment is defined as a value smaller than a reference thickness reduction trend Lref shown in FIG. 4 by a predetermined offset value $\Delta L$.

The "reference thickness reduction trend Lref" is a thickness reduction trend for the pipe P, which is assumed when the operation is performed while applying a predetermined reference operating parameter Dref (temperature=th1, flow rate=r1, and water quality=w1). The reference thickness reduction trend Lref may reflect a simulation result of the thickness reduction trend obtained by applying the reference operating parameter Dref to the pipe model M, or may be simply determined on the basis of a past result (or empirical value).

In the example shown in FIG. 4, the thickness reduction trend data D1 changes according to the reference thickness reduction trend Lref from the operation start time (time T0) to a predetermined time T1. However, at the time T1, a rate of thickness reduction (slope of the graph) increases for some reason and at a time T2 thereafter, the wall thickness falls lower than the lower limit threshold value Lmin. At this time point, the alert-processing unit 1102 performs the alert process (step S02).

Returning to FIG. 3, next, the cause-identifying unit 1103 of the monitoring device 11 performs a process for identifying what has caused the measured value of the wall thickness of the pipe P to fall lower than the lower limit threshold value (step S03).

Hereinafter, the process of step S03 by the cause-identifying unit 1103 will be described in detail with reference to FIG. 5.

As shown in FIG. 5, the cause-identifying unit 1103 inputs, to the pipe model M, the thickness reduction trend data D1, which is the result value of the thickness reduction trend from the operation start time (time T0) to the current time (time T2), and an operating parameter D2, which is the result value of the operating parameter during the same period, and pipe specifications D3 of the pipe P. Then, the cause-identifying unit 1103 uses the pipe model M to identify one or more operating parameters, which serve as a cause of the wall thickness of the pipe P falling lower than the lower limit threshold value Lmin, among a plurality of operating parameters D2.

In the example shown in FIG. 5, for example, it is assumed that the operating parameter D2 indicates that the "flow rate", which is one of the operating parameters, has changed from value r1 to value r2 at the time T1. Therefore, the cause-identifying unit 1103 simulates the thickness reduction trend after the time T1 by applying the operating parameter "flow rate=r2" to the pipe model M. Then, the cause-identifying unit 1103 determines whether the simulation result of the thickness reduction trend obtained in this way matches the thickness reduction trend data D1 (result value) from the time T1 to the time T2. When the simulation result of the thickness reduction trend after the time T1 matches the thickness reduction trend data D1, the cause-identifying unit 1103 identifies the "flow rate" changed at the time T1 as a "cause operating parameter" that is likely to have been a direct cause of the increased rate of thickness reduction of the pipe P (that is, causes the wall thickness of the pipe P to have fallen lower than the lower limit threshold value Lmin). Then, the cause-identifying unit 1103 outputs cause determination information DO1 indicating that the "flow rate" of the plurality of operating parameters D2 is the cause operating parameter (see FIG. 5).

According to the function of the cause-identifying unit 1103, when the wall thickness of the pipe P has fallen lower than the predetermined lower limit threshold value Lmin, not only is an alert simply issued, but also the cause that led to such a situation can be quickly and accurately ascertained.

The cause determination information DO1 shown in FIG. 5 indicates the likelihood of a cause causing an increase in the rate of thickness reduction using "high" and "low" information for each operating parameter, but there is no limitation to this aspect in other embodiments. For example, the cause-identifying unit 1103 according to other embodiments may numerically represent the possibility that a cause has increased the rate of thickness reduction for each operating parameter.

Returning to FIG. 3, next, the recommended operation-computing unit 1104 of the monitoring device 11 determines whether various required values have been received from the operator (step S04).

Here, when the change (r1→r2) made for the cause operating parameter (flow rate) identified in step S03 is due to an operation error of the operator of the power plant, the operator can return the rate of thickness reduction by simply returning the cause operating parameter represented by the cause determination information DO1 to the original value. In such a case, since it is not necessary for the operator to request the monitoring device 11 to output the recommended operating parameter, the operator does not need to input various required values (step S04; NO). In such a case, the monitoring device 11 ends the processing flow without performing any special process.

On the other hand, a case is also assumed where the change (r1→r2) of the cause operating parameter (flow rate) at the time T1 is intentionally performed by the operator due to circumstances related to the operation of the power plant. In such a case, the operator can inquire of the monitoring device 11 about whether there is a means capable of reducing the rate of thickness reduction, without returning the changed cause operating parameter. Specifically, the operator inputs a target value of a rate of thickness reduction to be acquired to the monitoring device 11 as a first required value, and further inputs the cause operating parameter (flow rate=r2) applied at the present time to the monitoring device 11 as a second required value.

When various required values are received from the operator in this way (step S04; YES), the recommended operation-computing unit 1104 of the monitoring device 11 calculates the recommended operating parameter that satisfies various required values received in step S04 (step S05).

Hereinafter, the process of step S05 by the recommended operation-computing unit 1104 will be described in detail with reference to FIG. 6 and FIG. 7.

Figure 6:
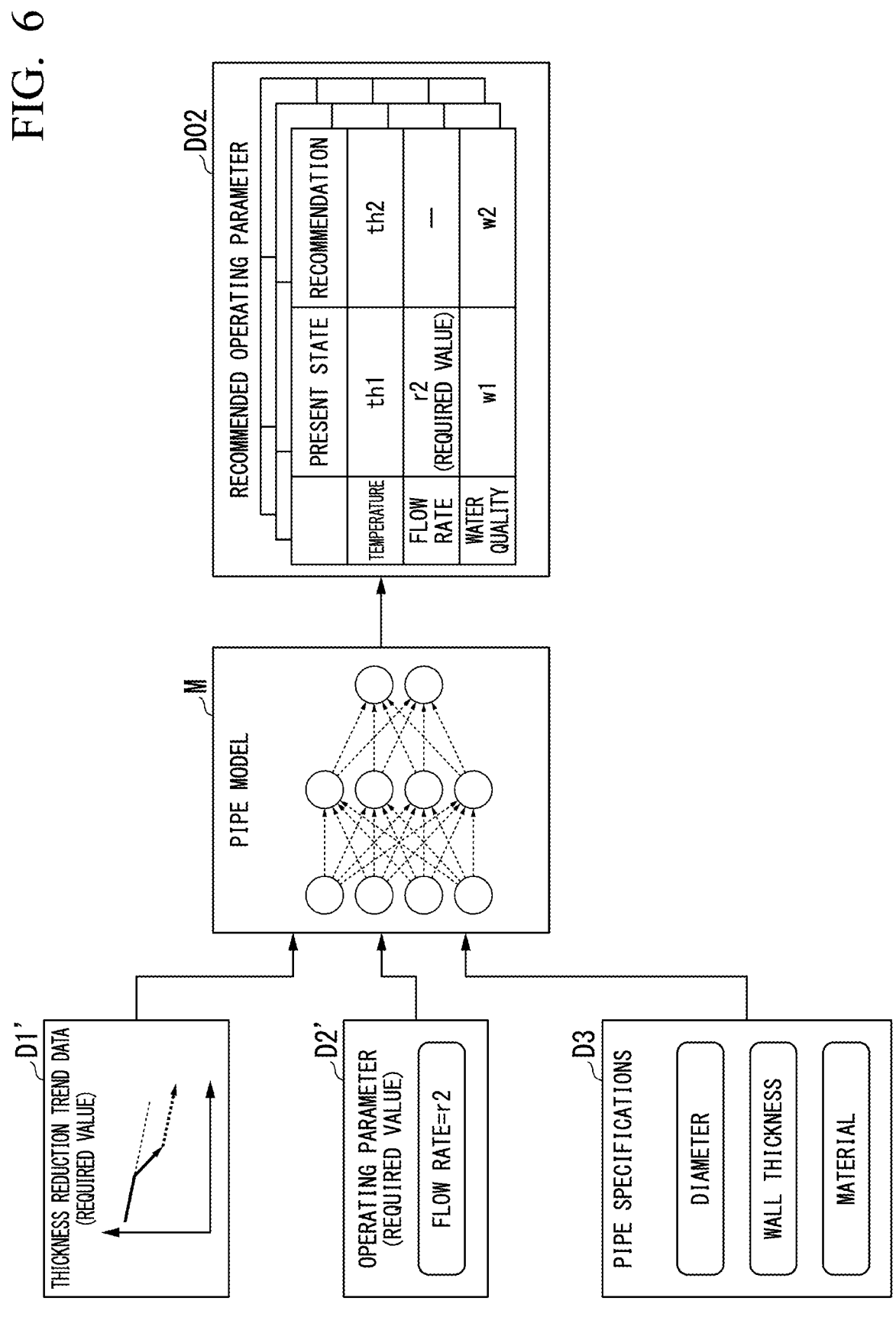
FIG. 6 is a diagram showing a specific aspect of a process performed by the monitoring device according to the first embodiment.
Figure 7:
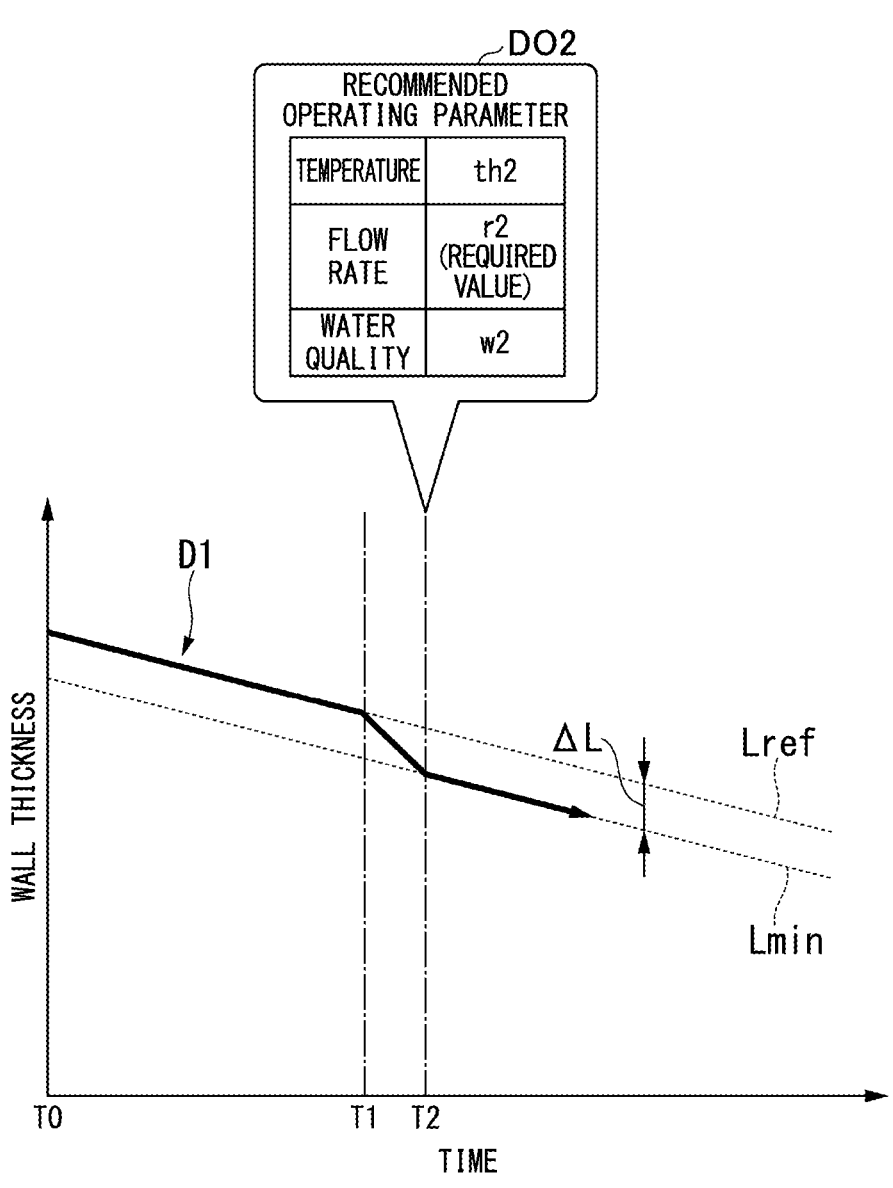
FIG. 7 is a diagram showing a specific aspect of a process performed by the monitoring device according to the first embodiment.

As shown in FIG. 6, the recommended operation-computing unit 1104 inputs, to the pipe model M, thickness reduction trend data D1', which is the required value of the thickness reduction trend (rate of thickness reduction), an operating parameter D2', which is the required value of the operating parameter, and pipe specifications D3 of the pipe P. The thickness reduction trend data D1' is defined as, for example, a thickness reduction trend that returns to the rate of thickness reduction before the time T1. The operating parameter D2' is, for example, the cause operating parameter (flow rate=r2) changed after the time T1 for some reason.

Then, the recommended operation-computing unit 1104 uses the pipe model M to output a recommended operating parameter D02 indicating a combination of operating parameters satisfying various input required values (see FIG. 6). In the example shown in FIG. 6, the recommended operation-computing unit 1104 outputs the recommended operating parameter D02 having "temperature=th2" and "water quality=w2" as candidates for a combination of operating parameters satisfying the requirement of returning to the rate of thickness reduction before the time T1 and maintaining the "flow rate=r2".

The operator actually applies the recommended operating parameter D02 output by the recommended operation-computing unit 1104, in the operation after the time T2. By so doing, as shown in FIG. 7, it is possible to return to a rate of thickness reduction equivalent to the rate of thickness reduction before the time T1 while maintaining the required value (flow rate=r2) of the operating parameter, after the time T2.

According to the function of the recommended operation-computing unit 1104, the operator can quickly ascertain a combination of operating parameters capable of reducing the rate of thickness reduction by referring to the recommended operating parameter D02. Particularly, when it becomes necessary to intentionally change some of a plurality of operating parameters, it is possible to ascertain a combination of operating parameters that do not increase the rate of thickness reduction of the pipe P while applying the change to some of the operating parameters.

So far, according to the monitoring device 11 of the first embodiment and the monitoring system 1 including the same, it is possible to quickly and accurately detect the occurrence of an abnormality in a pipe to be monitored from the trend of the wall thickness of the pipe.

Other Embodiments

So far, the monitoring device 11 according to the first embodiment and the monitoring system 1 have been described in detail, but specific aspects of the monitoring device 11 and the monitoring system 1 are not limited to those described above and various design changes and the like can be made within a range that does not deviate from the spirit of the invention.

The monitoring device 11 according to the first embodiment has been described as continuously monitoring the wall thickness as the degree of damage to the pipe P and detecting the occurrence of an abnormality in the pipe P on the basis of the trend of the wall thickness; however, in other embodiments, the present invention is not limited to this aspect.

For example, the monitoring device 11 according to another embodiment may continuously monitor the "degree of crack growth" as an aspect of the degree of damage to the pipe P and detect the occurrence of an abnormality in the pipe P on the basis of the trend of the "degree of crack growth". Particularly, in a plant, it is known that cracks are likely to grow over time at a joint portion between the pipe P and a tank. The monitoring system 1 according to another embodiment may include a crack sensor capable of measuring the degree of crack growth at the joint portion between the pipe P and the tank, and issue an alert when the degree of crack growth exceeds a predetermined determination threshold value.

9

Figure 8:
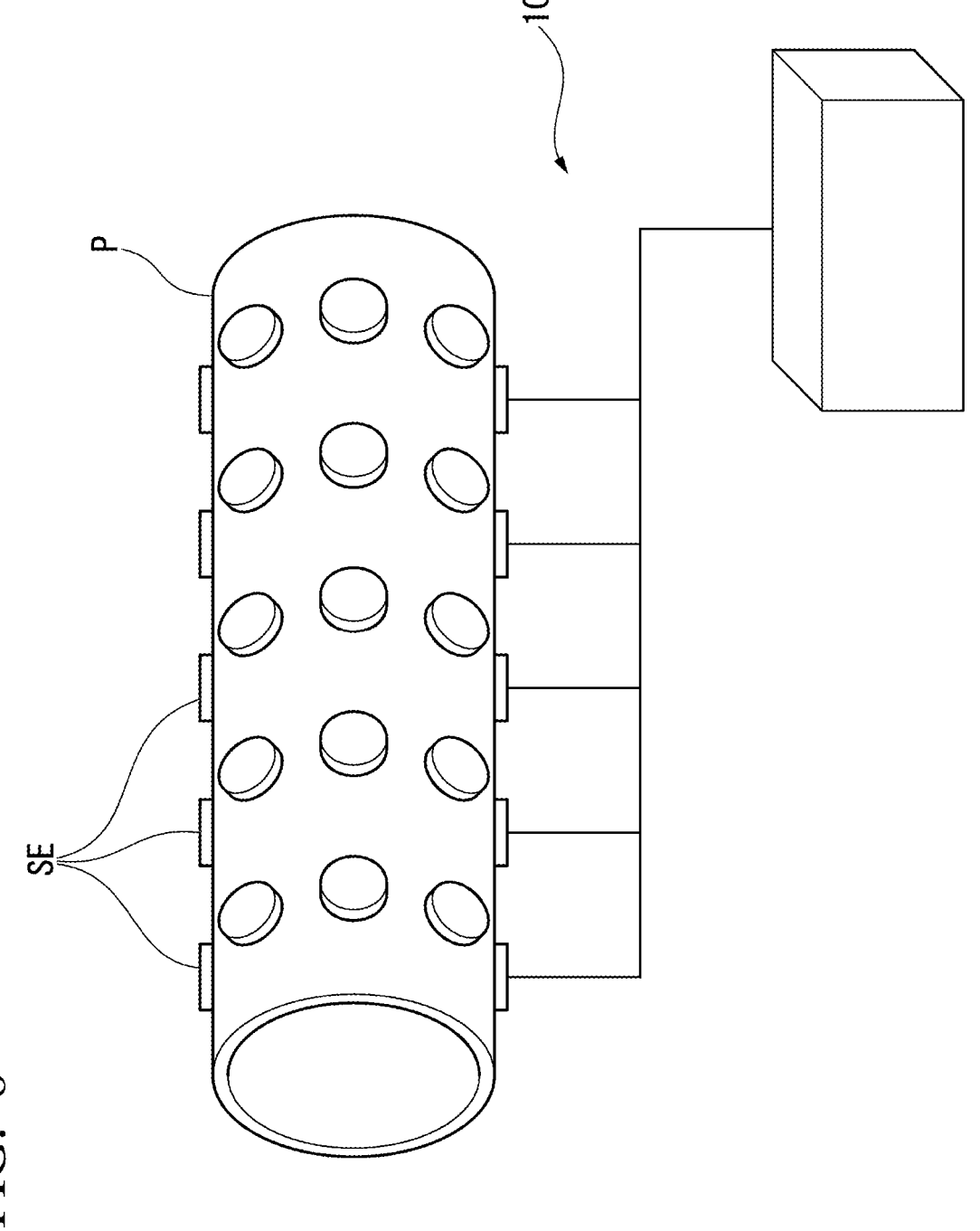
FIG. 8 is a diagram showing a configuration of a wall thickness sensor according to a modification of the first embodiment.

FIG. 8 is a diagram showing a configuration of a wall thickness sensor according to a modification of the first embodiment.

As shown in FIG. 8, the wall thickness sensor 10 according to the modification of the first embodiment may include a plurality of ultrasonic sensor elements SE. In the example shown in FIG. 8, five sets each including 8 ultrasonic sensor elements SE arranged at 45° in the circumferential direction of the pipe P are arranged at equal intervals along the extension direction of the pipe P.

By so doing, the monitoring device 11 can acquire data capable of ascertaining whether there is a bias in the thickness reduction trend (rate of thickness reduction) in the circumferential direction or the extension direction on the inner surface of the pipe P.

However, as in the present modification, when the plurality of ultrasonic sensor elements SE are arranged side by side on the pipe P and monitored, it is assumed that any of the plurality of ultrasonic sensor elements SE may output an abnormal (incorrect) measurement result due to a breakdown and the like. In this regard, the monitoring device 11 according to the present modification may have a function of automatically discriminating and excluding an abnormal value from a plurality of wall thickness measurement values acquired through the respective ultrasonic sensor elements SE by pre-machine learning. For example, when a wall thickness measurement value acquired through any one of ultrasonic sensor elements SE is clearly far from wall thickness measurement values acquired through other adjacent ultrasonic sensor elements SE, the measurement value acquired through the one ultrasonic sensor element SE is likely to be an abnormal value. In this way, the monitoring device 11 may monitor the pipe P while appropriately selecting the measurement values acquired through the plurality of ultrasonic sensor elements SE.

The monitoring device 11 according to the first embodiment described above includes a computer. Each functional unit included in the monitoring device 11 is stored in the storage 114 as a program. The CPU 110 reads the program from the storage 114, loads the read program on the memory 111, and operates according to the program, thereby performing functions as various functional units shown in FIG. 2. The storage 114 is an example of a non-transitory tangible medium. Other examples of a non-transitory tangible medium include optical discs, magnetic disks, magneto-optical disks, and semiconductor memories connected via an interface.

The program may be distributed to the monitoring device 11 via a network. In such a case, the monitoring device 11 loads the distributed program on the memory 111 and performs the above process. The program may be provided for implementing some of the aforementioned functions. For example, the program may implement the aforementioned functions in combination with other programs already stored in the storage 114, or in combination with other programs installed on another device. Furthermore, some of the aforementioned functions may be performed by another device connected via the network. That is, the aforementioned functions may be implemented by cloud computing, grid computing, cluster computing, or other parallel computing.

The monitoring device 11 may include a programmable logic device (PLD) in addition to the above configuration or in place of the above configuration. Examples of the PLD include a programmable array logic (PAL), a generic array logic (GAL), a complex programmable logic device (CPLD), and a field-programmable gate array (FPGA).

As described above, while some embodiments of the prevent invention have been described, all of these embodiments are presented as examples and are not intended to limit the scope of the invention. These embodiments can be embodied in a variety of other forms, and various omissions, substitutions, and changes can be made without departing from the spirit of the invention. These embodiments and modifications thereof are included in the scope and spirit of the invention and are included in the invention described in the claims and the equivalent scope thereof.

INDUSTRIAL APPLICABILITY

According to the aforementioned monitoring device, monitoring system, monitoring method, and a program, it is possible to quickly and accurately detect the occurrence of an abnormality in a pipe on the basis of the trend of the wall thickness of the pipe.

REFERENCE SIGNS LIST

1 Monitoring system
10 Wall thickness sensor
11 Monitoring device
110 CPU
1100 Degree of damage acquisition unit
1101 Determination unit
1102 Alert-processing unit
1103 Cause-identifying unit
1104 Recommended operation-computing unit
111 Memory
112 Display
113 Communication interface
114 Storage
D1, D1' Thickness reduction trend data
D2, D2' Operating parameter
D3 Pipe specifications
DO1 Cause determination information
DO2 Recommended operating parameter data
M Pipe model

The invention claimed is:

1. A monitoring device, comprising:
a degree of damage acquisition unit configured to acquire a degree of damage to a pipe, which is a degree of crack growth of the pipe, based on a measured value regarding damage to the pipe which is monitored by a sensor;
a determination unit configured to determine whether the degree of damage has fallen lower than a lower limit threshold value determined on the basis of reference operating parameters related to a fluid flowing through the pipe, wherein the lower limit threshold value changes on a time series;
a cause-identifying unit configured to identify a cause operating parameter, which is an operating parameter that has caused the degree of damage to fall lower than the lower limit threshold value, among a plurality of operating parameters related to the fluid flowing through the pipe when the degree of damage has fallen lower than the lower limit threshold value, and
a recommended operation-computing unit configured to, when a first required value related to a degree of change in the degree of damage is received, output a recommended operating parameter that is an operating parameter having the first required value;
wherein the recommended operating parameter is applied to prevent the further crack growth in the degree of damage to the pipe, wherein, when a second required value related to some of the plurality of operating parameters is further received, the recommended operation-computing unit calculates recommended operating parameters that are a combination of operating parameters having the second required value, wherein the first required value is a target value of a rate of thickness reduction to be acquired and the second required value is the cause operating parameter applied at the time point at which the second required value is received, and wherein the sensor includes a plurality of ultrasonic sensor elements arranged in sets, each set having ultrasonic elements arranged a predetermined angle in the circumferential direction of the pipe and at equal intervals along the extension direction of the pipe.

2. The monitoring device according to claim 1, further comprising:

an alert-processing unit configured to perform an alert process when the degree of damage has fallen lower than the lower limit threshold value.

3. A monitoring system, comprising:

the monitoring device according to claim 1; and a wall thickness sensor attached to the pipe.

4. A monitoring method, comprising:

acquiring a degree of damage to a pipe, which is a degree of crack growth of the pipe, based on a measured value regarding damage to the pipe which is monitored by a sensor; and determining whether the degree of damage has fallen lower than a lower limit threshold value determined on the basis of a reference operating parameter related to fluid flowing through the pipe, wherein the lower limit threshold value changes on a time series;

identifying a cause operating parameter, which is an operating parameter that has caused the degree of damage to fall lower than the lower limit threshold value, among a plurality of operating parameters related to the fluid flowing through the pipe when the degree of damage has fallen lower than the lower limit threshold value, and outputting a recommended operating parameter that is an operating parameter having the first required value, when a first required value related to a degree of change in the degree of damage is received;

wherein the recommended operating parameter is applied to prevent the further crack growth in the degree of damage to the pipe, wherein, the outputting a recommended operating parameter includes calculating recommended operating parameters that are a combination of operating parameters having the second required value when a second required value related to some of the plurality of operating parameters is further received, wherein the first required value is a target value of a rate of thickness reduction to be acquired and the second required value is the cause operating parameter applied at the time point at which the second required value is received, and wherein the sensor includes a plurality of ultrasonic sensor elements arranged in sets, each set having ultrasonic elements arranged a predetermined angle in the circumferential direction of the pipe and at equal intervals along the extension direction of the pipe.

5. A non-transitory computer-readable medium that stores a program causing a computer to perform:

acquiring a degree of damage to a pipe, which is a degree of crack growth of the pipe, based on a measured value regarding damage to the pipe which is monitored by a sensor; and determining whether the degree of damage has fallen lower than a lower limit threshold value determined on the basis of a reference operating parameter related to fluid flowing through the pipe, wherein the lower limit threshold value changes on a time series;

identifying a cause operating parameter, which is an operating parameter that has caused the degree of damage to fall lower than the lower limit threshold value, among a plurality of operating parameters related to the fluid flowing through the pipe when the degree of damage has fallen lower than the lower limit threshold value, and outputting a recommended operating parameter that is an operating parameter having the first required value, when a first required value related to a degree of change in the degree of damage is received;

wherein the recommended operating parameter is applied to prevent the further crack growth in the degree of damage to the pipe wherein, the outputting a recommended operating parameter includes calculating recommended operating parameters that are a combination of operating parameters having the second required value when a second required value related to some of the plurality of operating parameters is further received, wherein the first required value is a target value of a rate of thickness reduction to be acquired and the second required value is the cause operating parameter applied at the time point at which the second required value is received, and wherein the sensor includes a plurality of ultrasonic sensor elements arranged in sets, each set having ultrasonic elements arranged a predetermined angle in the circumferential direction of the pipe and at equal intervals along the extension direction of the pipe.

* * * * *